United States Patent [19]
Hansen

[11] Patent Number: 6,121,583
[45] Date of Patent: Sep. 19, 2000

[54] FOOD WARMING UNIT WITH HUMIDITY CONTROL

[75] Inventor: William J. Hansen, Brookfield, Wis.

[73] Assignee: Alto-Shaam, Inc., Menomonee Falls, Wis.

[21] Appl. No.: 09/407,243

[22] Filed: Sep. 28, 1999

[51] Int. Cl.[7] ............................... F27D 7/02; A47J 27/04
[52] U.S. Cl. ............................... 219/401; 126/20; 99/468
[58] Field of Search .............................. 219/401; 126/20, 126/369; 99/468, 469, 482, 483

[56] References Cited

U.S. PATENT DOCUMENTS

| | | |
|---|---|---|
| 2,499,525 | 3/1950 | Person . |
| 2,505,117 | 4/1950 | Hoffmann ............................... 219/397 |
| 3,521,030 | 7/1970 | Maahs . |
| 3,604,895 | 9/1971 | MacKay ............................... 219/401 |
| 3,800,123 | 3/1974 | Maahs . |
| 3,949,733 | 4/1976 | Miller et al. ............................... 219/401 |
| 3,979,575 | 9/1976 | Maahs ............................... 219/407 |
| 4,039,776 | 8/1977 | Roderick . |
| 4,123,969 | 11/1978 | Abbate ............................... 219/401 |
| 4,455,924 | 6/1984 | Wenzel . |
| 4,724,824 | 2/1988 | McCoy et al. ............................... 126/369 |
| 4,730,100 | 3/1988 | Pingelton . |
| 4,835,368 | 5/1989 | Fortmann et al. ............................... 219/401 |
| 4,891,498 | 1/1990 | Fortmann et al. ............................... 219/401 |
| 4,923,816 | 5/1990 | Heeg et al. ............................... 219/401 |
| 5,072,666 | 12/1991 | Hullstrung . |
| 5,235,903 | 8/1993 | Tippmann . |
| 5,365,039 | 11/1994 | Chaudoir . |
| 5,519,188 | 5/1996 | Yuichi et al. ............................... 219/401 |
| 5,558,010 | 9/1996 | Shelton . |
| 5,782,174 | 7/1998 | Cohn et al. . |

FOREIGN PATENT DOCUMENTS 3441767  5/1986  Germany .

*Primary Examiner*—Joseph Pelham
*Attorney, Agent, or Firm*—Andrus, Sceales, Starke & Sawall

[57] ABSTRACT

A food warming cabinet includes inner and outer spaced wall members, and an openable and closeable door forming an internal compartment in which heated food is maintained. A heated cable arrangement is interposed between the outer and inner wall members and provides a source of heat to keep the food warm. Heat insulation encases the heating cable arrangement and is disposed between the inner and outer wall members to support the heating cable arrangement and maintain the heat developed by the heating cable arrangement in the internal compartment. A drip pan is mounted within the internal compartment for catching drippings from the heated food maintained therein. A solenoid valve projects through the wall members for selectively delivering a spray film of water from an outside source to the drip pan. A controller is associated with the internal compartment for activating the solenoid valve for a predetermined time in response to opening of the door, whereby evaporation of moisture from the heated food lost in the opening of the door is replenished by evaporation of the water film deposited in the drip pan.

6 Claims, 3 Drawing Sheets

FOOD WARMING UNIT WITH HUMIDITY CONTROL

FIELD OF THE INVENTION

This invention relates generally to a food warming cabinet equipped with one or more electric heating cables and, more particularly, pertains to a food warming cabinet providing moisture or humidity control.

BACKGROUND OF THE INVENTION

The food warming unit of the present invention is predicated on a similar heating principle and concept as the ovens described in U.S. Pat. No. 3,521,030 issued Jul. 21, 1970 and U.S. Pat. No. 3,800,123 issued on Mar. 26, 1974. Both of these patents were developed and owned by the predecessor to the assignee of the present invention. The oven described in the above-mentioned patents includes one or more electric heating cables encased in the walls of the oven, and which extend around the interior compartment. The ovens described in the patents include an appropriate electric circuit for energizing the electric heating cable to cause it to generate heat in the oven.

Food warming or holding cabinets are well known appliances used to maintain heated food at a desired serving temperature. These warming cabinets have become valuable tools in the food industry, particularly in fast food and institutional applications. They allow food to be cooked in advance and then held at a desired temperature. The cabinets must be large enough to hold many servings, yet maintain a uniform temperature throughout. The food texture, moisture and flavor must be maintained during the time the food is held in the cabinet. The most important quality to be maintained is food moisture.

Many attempts have been made in the prior art to provide food warming devices having humidity and temperature control. The great majority of these devices are complex systems which require a separate well or bath for heating water with separate controls and heaters. Such designs require increased water usage and are more expensive to build and maintain. In some cases, circulating air within the warming and holding device contributes to the drying out of the food stored within.

Accordingly, it remains desirable to provide a food warming cabinet which retards evaporation of moisture from the food in the cabinet. It is also desirable to provide a food warming cabinet which is more economical to produce than competitive designs utilizing dedicated, hot water bath designs. It is likewise desirable to provide a food warming cabinet which measures temperature and door openings, and automatically adjusts to replenish the lost moisture in order to maintain the quality of the cooked food held within.

SUMMARY OF THE INVENTION

The present invention advantageously provides an insulated food warming cabinet wrapped with a plurality of heating cables. At the bottom of the cabinet is a drip pan for food drippings that is wetted by a water nozzle that is controlling the water flow via a microprocessor-controlled solenoid valve. The microprocessor control measures food cavity temperature as well as the opening and closing of the door via sensors. At the beginning of a warming cycle or opening of the cabinet door during use, the microprocessor control opens the solenoid valve for a predetermined time to wet the surface of the drip pan. Subsequent evaporation of the water in the pan supplies the needed humidity to the cabinet, and thus retards the evaporation of moisture from the food product so as to maintain maximum moisture content therein.

It is one object of the present invention to provide a heating cable-type food warming unit which introduces a controllable source of moisture during warming or heating.

It is also an object of the present invention to provide an apparatus for holding food at desired temperature levels.

It is a further object of the present invention to provide a food heating unit which is responsive to opening and closing of a door used to deposit and withdraw food relative to a warming chamber.

Yet another object of the present invention is to provide a food warming cabinet which utilizes the existing drip pan to selectively evaporate water into the interior of the cabinet.

Still a further object of the present invention is to provide a novel warming oven which promotes ease of clean-up by removal of a combination drip tray-water pan.

In one aspect of the invention, an oven has an inner wall structure for forming an internal compartment for holding heated food within. A heating cable arrangement is wrapped around the compartment and insulation encases the wall structure and the heating cable arrangement so as to maintain heat in the compartment. An outer shell structure surrounds the insulation, and an opening in at least one of the inner wall structure is formed with an openable and closeable door. A door sensing arrangement is connected to the door and responsive to opening and closing of the door. A temperature sensor is positioned in the internal compartment for sensing the temperature therein. A solenoid valve projects through the inner wall structure for periodically delivering a supply of water into the internal compartment. A combination drip tray and water reservoir is disposed in the internal compartment for catching drippings from the heated food and receiving the supply of water from the solenoid valve. A controller is positioned outside the internal compartment for activating the solenoid valve and the heating cable arrangement in response to the opening of the door and the temperature sensor. The door sensing arrangement comprises a magnet positioned in the door and a door sensor mounted outside the outer shell structure. The temperature sensor is located in an upper rear corner of the internal compartment.

In another aspect of the invention, a food warming cabinet includes inner and outer spaced wall members, and an openable and closeable door forming an internal compartment in which heated food is maintained. A heating cable arrangement is interposed between the outer and inner members and provides a source of heat to keep the food warm. Heat insulation encases the heating cable arrangement and is disposed between the inner and outer members to support the heating cable arrangement and maintain the heat developed by the heating cable arrangement in the internal compartment. A drip pan is mounted within the internal compartment for catching drippings from the heated food maintained therein. A solenoid valve projects through the wall members for selectively delivering a spray film of water from an outside source to the drip pan. A controller is associated with the internal compartment for activating the solenoid valve for a predetermined time in response to opening of the door. With this construction, evaporation of moisture from the heat lost in the opening of the door is replenished by evaporation of the water film deposited in the drip pan. The controller is mounted in a control bonnet disposed on the top, outer wall member. A door magnet is located in an upper edge of the door, and a door sensor is positioned in the control bonnet and alignable with the door magnet when the door is closed to prevent the solenoid valve from delivering water to the drip pan. A temperature sensor is located within the internal compartment. The controller is connected to and responsive to the temperature sensor upon opening of the door to temporarily activate the heating cable arrangement so as to further heat the food in the internal compartment. The drip pan is slidably disposed along a bottom inner wall member. The heating cable arrangement is wrapped around the internal compartment. An electric circuit having a source of alternating current for energizing a power supply is connected to the controller. The controller is electrically connected to a door sensor for monitoring opening and closing of the door, a temperature sensor for monitoring temperature in the internal compartment, the solenoid valve, and the heating cable arrangement.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
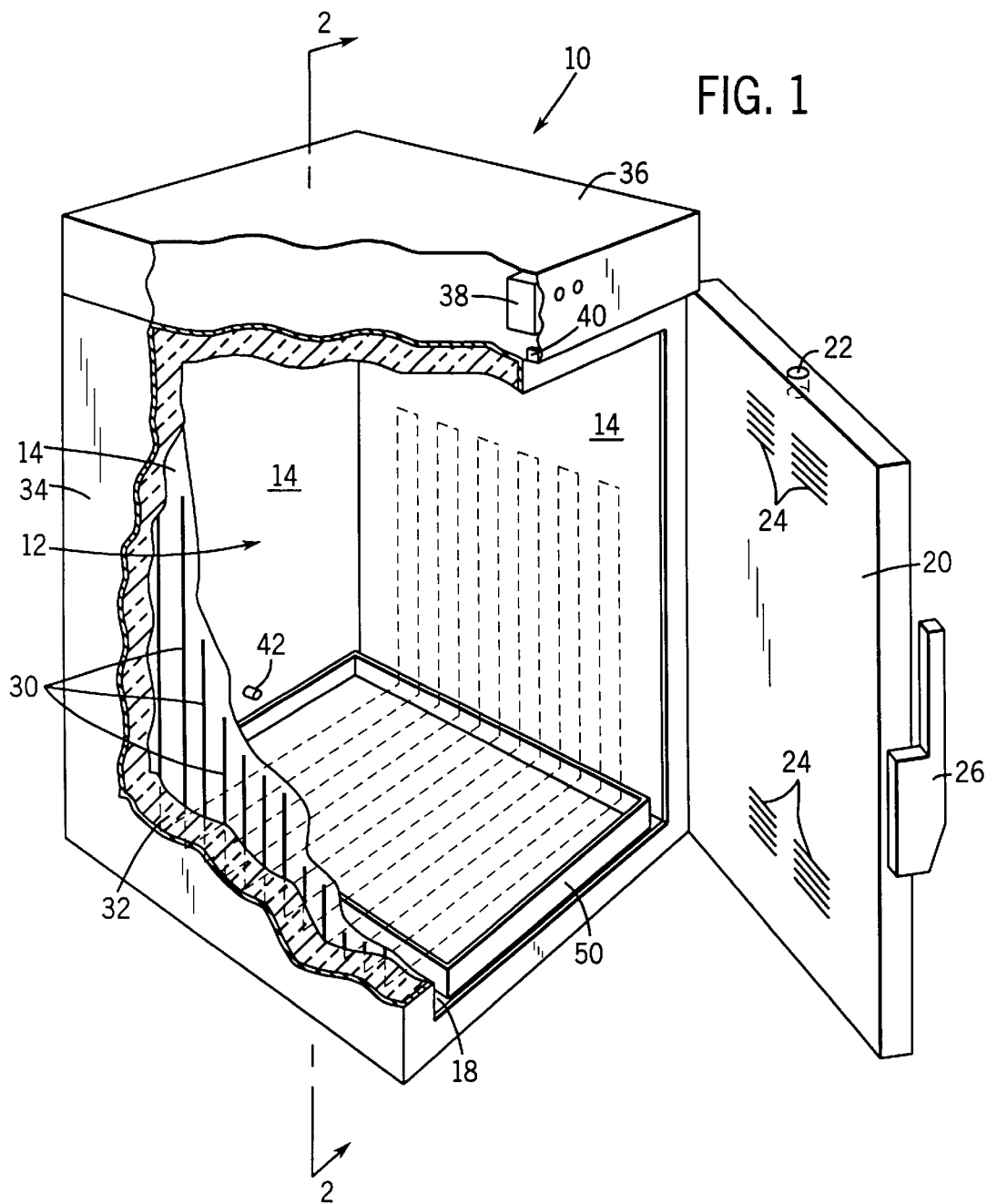
FIG. 1 is a perspective view, in partial cross section, of a food warming unit embodying the invention with its door swung open.

Before proceeding with the detailed description of the invention, it should be mentioned that the preferred embodiment will be set forth in connection with a warming cabinet or oven used to heat and hold food at a predetermined temperature and humidity level. However, it should be appreciated that the present invention also applies to cooking and holding ovens of the type set forth in aforementioned U.S. Pat. No. 3,800,123.

Referring now to the drawings, the food warming cabinet or oven embodying the present invention is generally designated by the reference numeral 10. In the preferred embodiment, the warming cabinet is a substantially rectangular, box-like unit having an internal food compartment 12 formed of inside shell walls 14 with a series of food holding shelves 16, a wall floor 18 and a hinged door 20. The door 20 is provided with a magnet 22 along its top edge, and a series of vents 24 in the upper and lower portions of the inside surface of the door 20. A side edge of the door 20 carries a handle 26 which cooperates with a latch device (not shown) on an outer face of the cabinet 10. Alternatively, handle 26 may include an internal magnet to keep the door 20 shut. As a result, the door-mounted magnet 22 can be eliminated by placing sensor 40 in the door jamb behind a strike plate. This modification then uses door handle magnet as the item that triggers the related sensor 40. Although not illustrated, the door 20 may have a transparent window so as to reveal the food compartment 12 in the cabinet 10. A continuous front gasket 28 lies between the door 20 and the face of the cabinet 10 to create a sealed enclosure.

Figure 3:
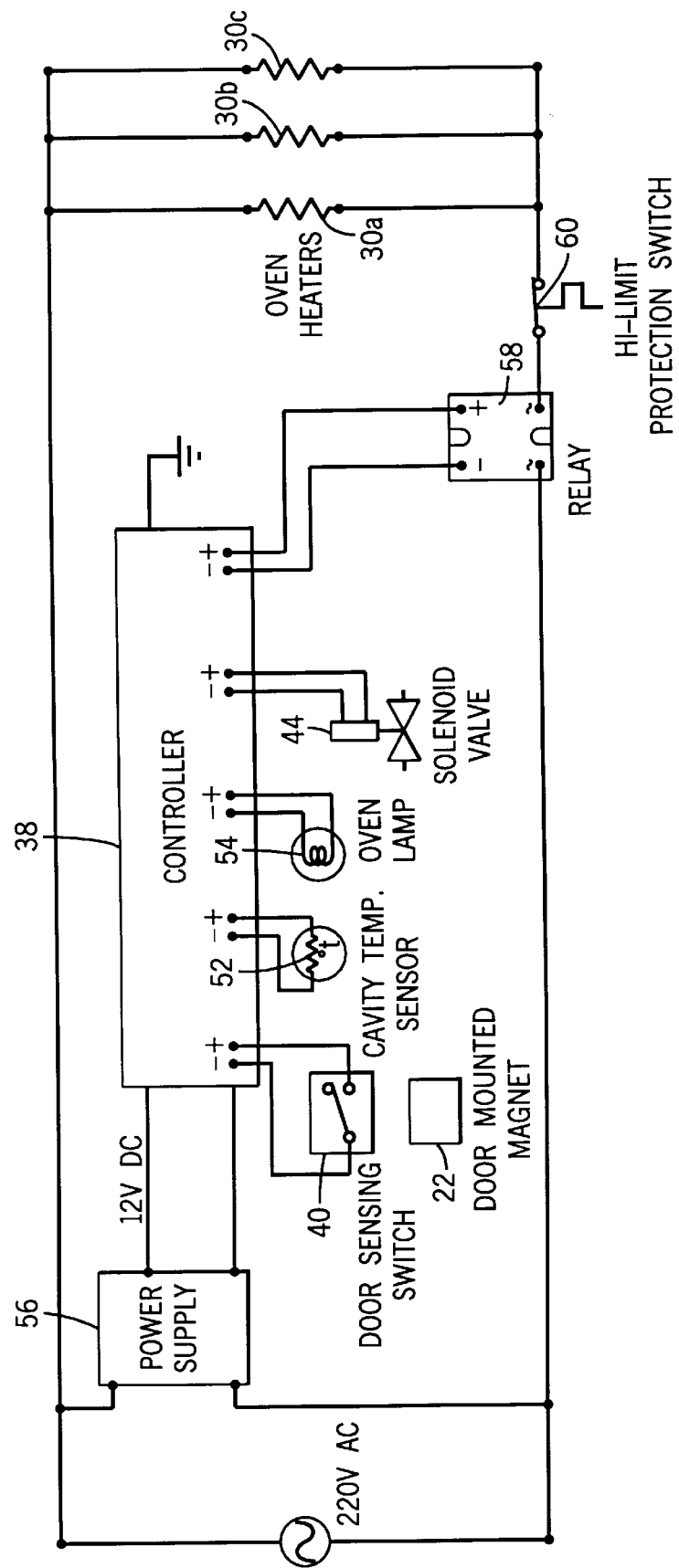
FIG. 3 is a circuit diagram for the food warming unit. heating

One or more electric heating cables 30 are wrapped around the inside walls 14 and under the floor 18, the cables being so located so as to provide a desired uniform heat in the oven compartment 12. As represented in FIG. 3, the cables 30 may actually represent three independent sections of heaters 30a, 30b, 30c, each of which is looped around inside walls 14 at regular intervals. The cables 30 may be of the type presently manufactured by Harbour Industries of Shelbourne, Vt. The cables 30 include an internal Nichrome resistance wire, a layer of insulation for protecting the wire and a glass braid for strengthening the wire. This type of cable has many advantages which include a long maintenance free life which is important due to the inaccessibility location of the cable in the structure of the invention. Each cable 30 also has an unusually high mechanical strength.

The construction of the cabinet 10 may be completed by insulation 32 which can be fiberglass sheets placed around the inside walls 14, wall floor 18, and cables 30 within the compartment 12. The top will also include insulation 32. An outer shell 34 preferably formed of a sheet metal encloses the cabinet 10 and provides the necessary protection.

Figure 2:
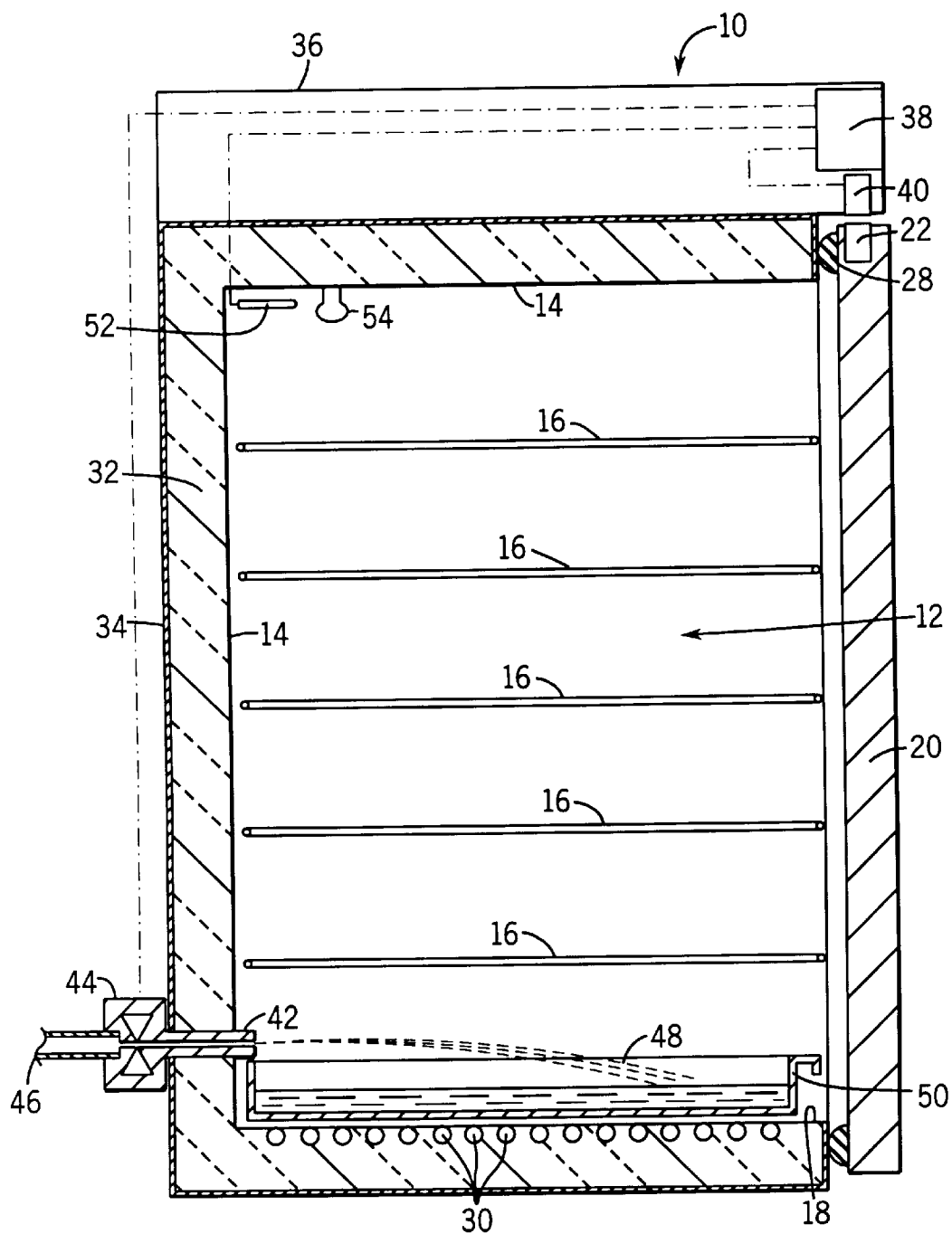
FIG. 2 is a cross sectional view taken on line 2—2 of FIG. 1 with the door closed.

Disposed over the top surface of outer shell 34 is a control bonnet 36 which houses an electronic controller 38 such as a microprocessor along the front wall thereof. A door sensor 40 is also provided along the front wall directly beneath the controller 38 and is adapted to be aligned with the door magnet 22 when the door 20 is in a closed position such as shown in FIG. 2.

The lower, back surface of inner shell 14 is provided with an inwardly projecting spray nozzle 42 which is coupled to an electronic solenoid valve 44 regulated by controller 38 and positioned at the lower, rear of outer shell 34. The solenoid valve 44 includes an inlet 46 for a water supply which is selectively delivered in a spray film 48 into a drip pan 50 that is slidably mounted on the wall floor 18. As is well known, the drip pan 50 serves to catch drippings from food supported on the wire shelves 16; however, as a feature of the invention, the hot drip pan 50 also acts as a water reservoir from which water delivered through nozzle 42 by solenoid valve 44 can be evaporated and humidified into the food compartment 12 to keep the shelved food from drying out. An upper, rear corner of compartment 12 is equipped with a temperature sensor 52 for monitoring the temperature of the compartment as the door 20 is opened and closed to load and withdraw cooked food from shelves 16. An oven lamp 54 is installed on the top wall to illuminate the compartment 12 when the door 20 is opened.

As seen in FIG. 3, the electric cables 30 define three heaters 30a, 30b and 30c included in an energizing circuit which is preferably connected to an appropriate 220 volt alternating current source that is converted by a power supply 56 to a 12 volt DC signal. This signal powers the controller 38 which is grounded and electrically connected to door sensor 40, temperature sensor 52, oven lamp 54 and solenoid valve 44. A relay 58 coupled to a high limit protection switch 60 is also connected with controller 38.

With the cabinet door 20 closed, and the door sensor 40 aligned with the door magnet 22, the circuit will remain de-energized. However, once the door 20 is opened, the controller 38 is able to measure compartment temperature via the temperature sensor 52 and the opening and closing of door 20 via door sensor 40. At the beginning of a warming cycle or upon opening/closing of door 20, controller 38 opens the solenoid valve 44 for a predetermined time to wet the surface of the drip pan 50. Subsequent evaporation of the water in the hot pan 50 supplies humidity to the cabinet 10. This, in turn, retards any evaporation of moisture from the food product which escapes from the door opening, thereby retaining maximum moisture content within the food product. In addition, as the door 20 is opened and closed during normal operation, the controller 38 can respond to the temperature sensor 52 to make up for lost heat by energizing the heaters 30a, 30b, 30c with full power for a predetermined amount of time before switching back to the temperature sensor 52, and also opening the solenoid valve 44 to replenish the lost moisture by laying down a film of water in the hot drip pan 50 to be evaporated.

Because the opening and closing of the door 20 is being sensed, the controller 38 can be used not only for humidity recovery, but also as a superior way of recovering from lost heat. The warmer oven sensor 52 is placed in the top rear of the cabinet for protection from mechanical abuse such as pans banging into it. Because of this location, the sensor 52 is warmed from the surrounding metal mass and is slow to respond to quick opening and closings of the door 20. The electronic control is now programmed to turn the heaters on for a predetermined amount of time (10 seconds) regardless of the temperature sensor 52 upon closure of the door 20. This "boost" of heat is used to recover the lost heat from the opening of the door 20. After the "boost" of heat is added, the control reverts back to using the sensor as a means of controlling the cavity temperature.

In cases where hard water is used, the minerals deposited from the humidification process are left in the drip pan 50 and can easily be removed and cleaned up concurrently as the food drippings are withdrawn. It should be appreciated that the humidity control provided by the present invention entails lower cost to produce and use than competitive, dedicated hot water bath designs. The present invention advantageously uses much of the current structure of existing food warmers and does not require the addition of separate wells for heating water with additional heaters and controls. In prior art devices, excess water in wells or boilers must be drained for cleaning purposes. This excess water is not an issue in the present invention. Rather, the inherent design in the food cabinet 10 uses minimal water with a small if non-existent amount of residual water to dispose at the end of the day Increased water savings can be realized over the life of the unit. It should also be noted that the present invention does not rely upon the circulation of air inside the warmer 10, although a fan may be added if desired.

The present invention thus provides an improved food warming cabinet or oven 10 which is relatively simple in construction and easy to control. Food warmer 10 of the invention operates reliably to adjust the temperature and humidity of heated foods in a manner which maintains their highest quality.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention as set forth with the following claims.

What is claimed is:

1. A food warming cabinet comprising:

inner and outer spaced wall members and an openable and closeable door forming an internal compartment in which heated food is maintained;

a heating cable arrangement interposed between the inner and outer members and providing a source of heat to keep the food warm;

heat insulation means encasing the heating cable arrangement and disposed between the inner and outer members to support the heating cable arrangement and maintain the heat developed by the heating cable arrangement in the internal compartment;

a drip pan mounted on the bottom of the internal compartment for catching drippings from the heat food maintained therein;

a solenoid valve projecting through the wall members immediately above the drip pan for selectively delivering a spray film of water from an outside source into the internal compartment and to the drip pan;

a controller associated with the internal compartment for activating the solenoid valve for a predetermined time in response to opening of the door, whereby evaporation of moisture from the heated food lost in the opening of the door is automatically replenished by evaporation of the water film deposited in the drip pan; and an electric circuit having a source of alternating current for energizing a power supply connected to the controller which is electrically connected to a door sensor for monitoring intermittent opening and closing of the door during a warming cycle of the cabinet, a temperature sensor for monitoring temperature in the internal compartment, the solenoid valve, and the heating cable arrangement.

2. The cabinet of claim 1, wherein the controller is mounted in a control bonnet disposed on the top, outer wall member.

3. The cabinet of claim 1, including a door magnet located in an upper edge of the door, and a door sensor positioned in the control bonnet and alignable with the door magnet when the door is closed to prevent the solenoid valve from delivering water to the drip pan.

4. The cabinet of claim 1, including a temperature sensor located within the internal compartment, the controller being connected to and responsive to the temperature sensor upon opening of the door to temporarily activate the heating cable arrangement so as to further heat the food in the internal compartment.

5. The cabinet of claim 1, wherein the drip pan is slidably disposed along a bottom, inner wall member.

6. The cabinet of claim 1, wherein the heating cable arrangement is wrapped around the internal compartment.

* * * * *